United States Patent [19]

Chen et al.

[11] Patent Number: 4,897,007

[45] Date of Patent: Jan. 30, 1990

[54] STEADY PUSH PIN

[76] Inventors: Haw-Renn Chen; Feichu H. Chen, both of 4057 Little Hollow Pl., Moorpark, Calif. 93021

[21] Appl. No.: 227,677

[22] Filed: Aug. 1, 1988

[51] Int. Cl.$^4$ .................. F16B 23/00; F16B 35/06
[52] U.S. Cl. .................. 411/401; 411/409; 16/121
[58] Field of Search ............ 411/400, 401, 408, 409, 411/482, 485, 923, 919; 248/217.4; 16/121

[56] References Cited

U.S. PATENT DOCUMENTS

| | | | |
|---|---|---|---|
| 434,650 | 8/1890 | Adams | 16/121 |
| 885,687 | 4/1908 | Chenoweth | 16/121 |
| 2,294,802 | 9/1942 | Reich | 411/409 |
| 3,995,650 | 12/1976 | DiVito | 16/121 |

Primary Examiner—Neill R. Wilson

[57] ABSTRACT

A steady pin, which is renovated from a push pin, contains a threaded stem and an elliptical cylinder head with a vertical concave periphery surface. The threaded stem can provide the steady pin with a better horizontal load holding capability and a better tacking repetability at the same tacked position on a wall or a board when the steady pin is tacked by a user. The elliptical head of the steady pin can generate a proper amount of torque on a steady pin by user's thumb and index finger such that the rotating motion of the steady pin is easy to be performed. The vertical concave periphery surface on the steady pin head is utilized to generate a vertical force from the user's fingers to push the steady pin into or pull the steady pin out of a wall, bulletin, or notice board.

3 Claims, 1 Drawing Sheet

STEADY PUSH PIN

BACKGROUND OF THE INVENTION

A push pin is a convenient device for holding an object on the bulletin, notice board, or wall. However, there are several pitfalls on utilizing the push pin. First, a push pin can not effectively hold a horizontal load. Secondly, when used with a wall, a push pin can not be tacked to the same location many times since the push pin hole will be worn out so much that it can no longer steadily hold the object after several tackings on the wall. The present invention is concerned with these shortcomings of a push pin, and it is the general aim of this invention to provide a steady pin which not only reserves the conveniences of a push pin and eliminates the shortcomings of a push pin, but also is designed to be more versatile on performing the hanging functions under various circumstances.

SUMMARY OF THE INVENTION

In accordance with the present invention, the stem of a steady pin is threaded such that it can enhance the functions of a push pin to include the horizontal load holding capability and repetitive tacking of the steady pin to the same position without degrading the holding capability of the steady pin. In addition to the feature of the threads on the stem, the head of a steady pin is designed to be an elliptical cylinder with the vertical concave periphery surface such that a torque can be generated by holding fingers to help the threaded stem going into the wall.

BRIEF DISCRIPTION OF THE DRAWINGS

DETAIL DESCRIPTION OF THE EMBODIMENT

Figure 1:
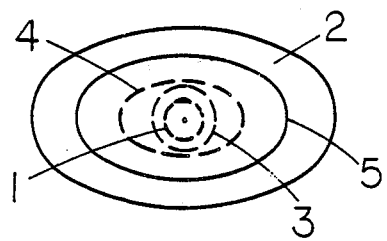
FIG. 1 shows the top view of the basic configuration of the present invention.
Figure 1A:
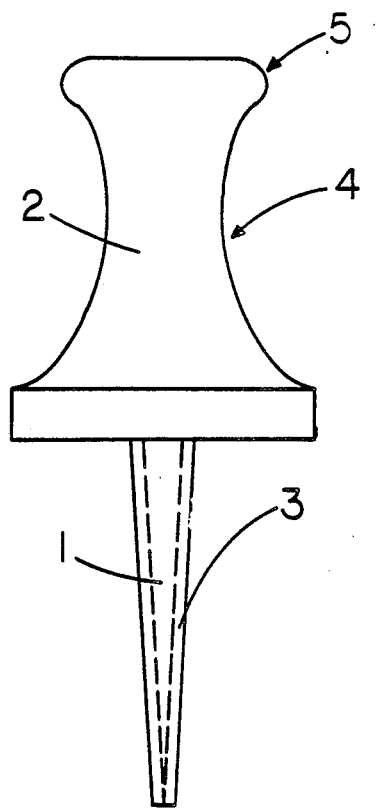
FIG. 1A shows the side view of the basic configuration of the present invention.

A steady push pin is composed of two portions: a threaded stem and an elliptical cylinder head. As shown in FIG. 1 and FIG. 1A, the threaded stem is indicated by numeral 1 and the elliptical cylinder head is indicated by 2. To fully utilize the special feature of a threaded stem, a rotating motion is needed to coordinate with the tacking action when a steady push pin is tacked into a wall or a board.

The stem of a steady pin is threaded to improve the horizontal holding capability and the pin-tacking repetibility. The threads, as indicated by 3, are shaped in various sizes and configurations to fit various needs. The larger the pitch of the threads is formed, the faster a steady push pin can be tacked to the wall and the less the horizontal load holding capability will be. On the other hand, the smaller the pitch of the threads is formed, the slower a steady push pin can be tacked to the wall and the more horizontal load holding capability will be.

The head of a steady push pin can be made of either metal or plastics. The steady push pin head is shaped as an elliptical cylinder with a vertical concave periphery surface as indicated by 4. The elliptical cylinder is used to generate proper amount of torque on the steady push pin by the user's thumb and index finger, and the vertical concave periphery surface is utilized to generate a vertical force from the user's fingers to push the steady push pin into or pull the steady push pin out of the wall, bulletin, or notice board. In addition, the corner at the top of the elliptical cylinder head is rounded, as indicated by 5, to prevent the corner from hurting the user's fingers.

We claim:

1. A steady push pin comprising a threaded stem with a pointed end and an elliptical cylinder head, which is formed with the cross sections transverse to said threaded stem being larger nearby both ends and smoothly getting smaller from said both ends inwards along the length such that the smallest cross section transverse to said threaded stem is at an optimal location somewhere in between said both ends, whereby said steady push pin can be tacked into a solid media and used as a means to hang or somewhat vertically hold an article on said solid media with both vertical and horizontal load holding capability.

2. A steady push pin as set forth in claim 1 wherein the corner of the top of said elliptical cylinder head of said steady push pin is rounded.

3. A steady push pin as set forth in claim 1 wherein said threaded stem is formed with threads which have large pitch so that not only said horizontal load holding capabilities of said steady push pin are enhanced but also tacking said steady push pin into a solid media is fast and easy.

* * * * *